(12) United States Patent
Recht et al.

(10) Patent No.: US 12,130,946 B2
(45) Date of Patent: Oct. 29, 2024

(54) PRIVATE RECOMMENDATION IN A CLIENT-SERVER ENVIRONMENT

(71) Applicant: TURNER BROADCASTING SYSTEM, INC., Atlanta, GA (US)

(72) Inventors: Benjamin Recht, Brooklyn, NY (US); Erica Greene, Brooklyn, NY (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 134 days.

(21) Appl. No.: 17/832,644

(22) Filed: Jun. 4, 2022

(65) Prior Publication Data

US 2022/0382909 A1 Dec. 1, 2022

Related U.S. Application Data

(63) Continuation of application No. PCT/US2020/063417, filed on Dec. 4, 2020.

(60) Provisional application No. 62/943,364, filed on Dec. 4, 2019.

(51) Int. Cl.
*G06F 21/62* (2013.01)
*G06F 16/435* (2019.01)
*G06F 16/48* (2019.01)

(52) U.S. Cl.
CPC ........ *G06F 21/6263* (2013.01); *G06F 16/435* (2019.01); *G06F 16/48* (2019.01)

(58) Field of Classification Search
None
See application file for complete search history.

(56) References Cited

U.S. PATENT DOCUMENTS

| | | | |
|---|---|---|---|
| 8,613,024 B2 * | 12/2013 | Bovenschulte | H04N 21/4661 725/35 |
| 9,754,307 B2 | 9/2017 | Veugen | |
| 9,948,663 B1 | 4/2018 | Wang | |
| 2003/0163518 A1 * | 8/2003 | Thurston | H04N 21/252 348/E7.071 |
| 2014/0059213 A1 | 2/2014 | Ollikainen | |
| 2016/0196580 A1 | 7/2016 | Hong | |
| 2017/0209362 A1 * | 7/2017 | Noh | A61K 36/25 |
| 2018/0101576 A1 * | 4/2018 | Lin | G06F 40/30 |

FOREIGN PATENT DOCUMENTS

| WO | WO 2012/013996 | 3/2012 |
|---|---|---|
| WO | 2017/209362 A1 | 12/2017 |

OTHER PUBLICATIONS

WO, PCT/US2020/063417 ISR, Mar. 16, 2021.
Gabor Takacs, et al. "Alternating Least Squares for Personalized Ranking," Proceedings of the 2022 ACM Southeast Conference, New York, NY, USA, Sep. 9, 2012, pp. 83-90.
Extended European Search Report issued for European Patent application No. 20895868.6 dated Nov. 3, 2023.

* cited by examiner

*Primary Examiner* — Cai Y Chen
(74) *Attorney, Agent, or Firm* — Bookoff McAndrews, PLLC

(57) ABSTRACT

Methods and systems for recommending content to a client device operated by a user include receiving a set of ratings for each of a first set of content items by a user from a client device for use in a factor model. The set of ratings is not maintained in the server for longer than necessary to calculate a rating vector and/or to update a matrix factor defined by the rank of the factor model and a total number of content items eligible for ranking.

18 Claims, 3 Drawing Sheets

PRIVATE RECOMMENDATION IN A CLIENT-SERVER ENVIRONMENT

PRIORITY CLAIM

The present application is a continuation of International Patent App. No. PCT/US20/63417, filed Dec. 4, 2020, which claims priority to U.S. provisional patent application Ser. No. 62/943,364 filed Dec. 4, 2019, both of which are incorporated herein in their entirety by reference.

FIELD

The present application relates to improving user privacy of recommender systems in online environments.

BACKGROUND

Recommender systems, also referred to herein as recommenders and in singular as a recommender, are a class of machine learning algorithms and computing systems using such algorithms that analyze user engagement with one or more computerized information resources, learn user interests and preferences by analyzing the engagement history, and provide recommendations to the user regarding information likely to be of interest. Such systems are useful to end users, but if designed naively may expose details of the user's engagement history to the recommender system. Consequently, various methods have been developed by which users can benefit from using recommender systems while obfuscating their engagement history at least partly and retaining a degree of privacy regarding their engagement history. Prior methods may be subject to certain disadvantages.

Privacy-preserving recommender systems often differentiate between the learning phase of training a recommender and the recommendation phase. To implement differential privacy during the learning phase, some have shown that the addition of random noise to training data is sufficient for the popular schemes of nearest-neighbors and matrix factorization. Others have demonstrated that Matrix Factorization (MF) models can be learned online obviating the need for the retention of any user data by a central server. In this context, differential privacy considers whether the presence or absence of a user's information can be detected by an adversary with access to the trained machine learning model.

However, when the content being consumed is perceived as being of a sensitive nature, that users may be hesitant to reveal preferences to a recommender as needed to receive quality recommendations. Even if those preferences cannot later be extracted from the model itself and raw user request data is not retained by a system server, an interloper or a rogue insider with access to the underlying recommendation model can use the model to determine with reasonable accuracy in any individual request which part of the user's engagement history is genuine and which part is noise, leaving a user's true engagement history effectively in the open.

Some architectural and algorithmic solutions for privacy defense send perturbed data to a centralized server and leverage the client device to store a copy of the user's history as well as process and filter recommendations that are returned. Another approach implements a decentralized architecture and data obfuscation through ratings augmentation. Others have introduced the notion of using data perturbation to attain plausible deniability in recommender systems, and then extended their work to the scenario where user ratings are binary, as well as to combining Principal Component Analysis (PCA) and Singular Value Decomposition (SVD) based recommenders with random perturbations of integer ratings. Another approach challenges the item-invariance of the perturbation magnitude in these randomization approaches, but does not address the cluster structure of this type of data. Others have attempted to preserve cluster structure when obfuscating training data using a two-step transformation. Cluster structure is acknowledged and leveraged but only for preventing de-anonymization by a third party, and obfuscation of a user's general interests is lacking.

Recent advances in privacy for recommender systems such as summarized above have focused on limiting the ability of an adversary to access user data from a trained machine learning model. However, these private methods for training recommenders may not effectively obfuscate a user's engagement history at recommendation time. Thus, prior approaches may leave users' engagement histories open to discovery by unauthorized or adversarial entities.

It would be desirable, therefore, to develop new methods and other new technologies for improving user privacy in recommender systems, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a method for recommending content to a client device operated by a user may include receiving, by at least one processor, a set of ratings for each of a first set of content items by a user from a client device. The method may further include estimating, by the at least one processor, a user weight vector in a factor model for recommendations. The method may further include generating, by the at least one processor based on the user weight vector and a factor model using alternating minimization, a rating vector comprising a predicted rating for each of second content items. The method may include sending the rating vector to the client device and deleting the set of ratings received from the user. Deleting the set of ratings improves user privacy. Using alternate minimization in the factor model enable deleting the set of ratings used to develop the user weight vector.

As used herein, a "client device" includes at least a computer processor coupled to a memory and to one or more ports, including at least one input port and at least one output port (e.g., a desktop computer, laptop computer, tablet computer, smartphone, PDA, etc.). A computer processor may include, for example, a microprocessor, microcontroller, system on a chip, or other processing circuit. As used herein, a "processor" means a computer processor. The methods disclosed herein may be encoded as program instructions in a computer memory coupled to the processor. When executed by the processor, the program instructions cause the apparatus to perform the operations of the method.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagram form to facilitate focus on novel aspects of the present disclosure.

Figure 1:
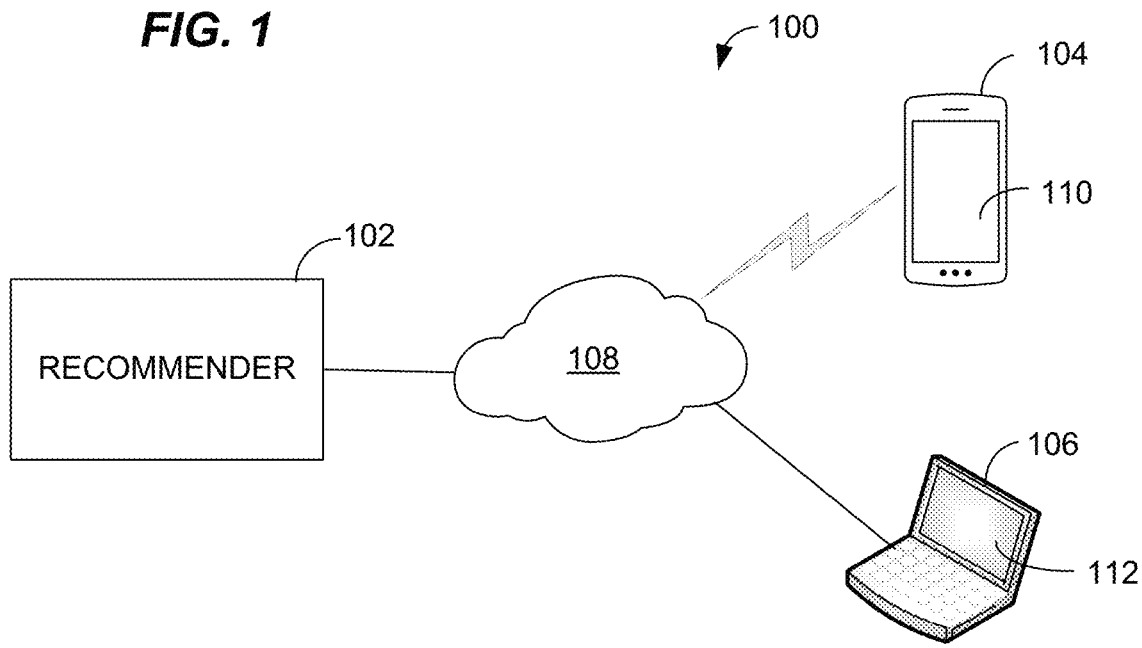
FIG. 1 is a schematic diagram illustrating a recommender system communicatively coupled to client devices providing private recommendation for user privacy.
Figure 2:
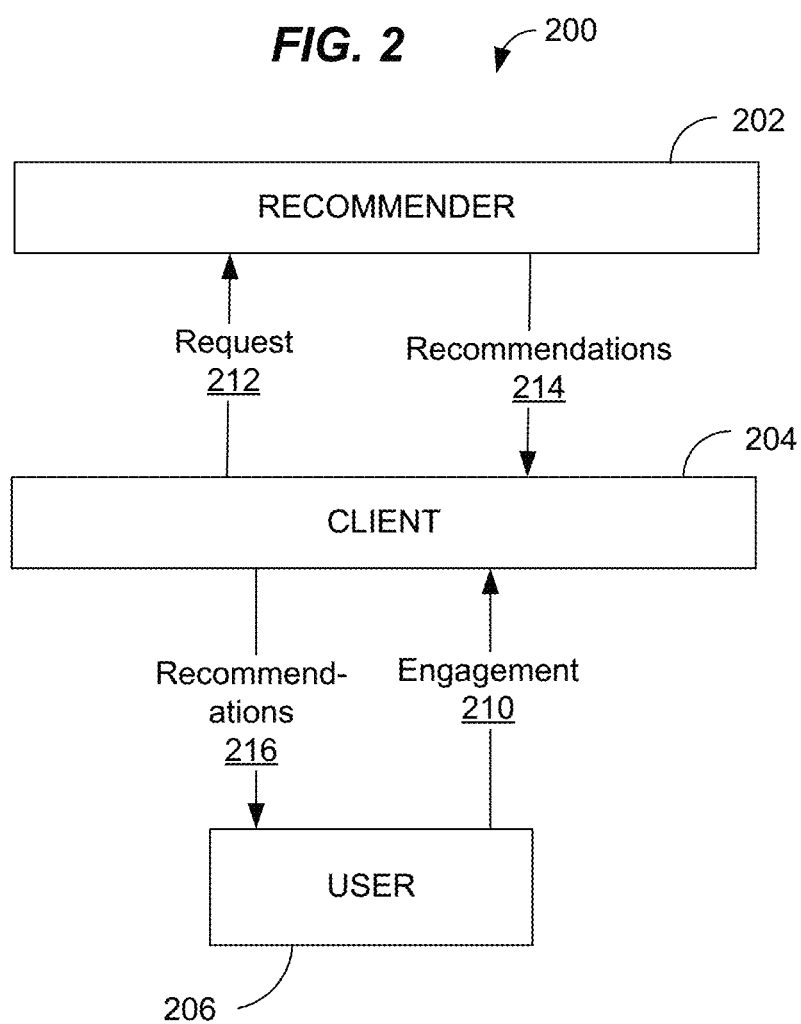
FIG. 2 is a concept diagram illustrating private recommendation data flow.

Referring to FIGS. 1 and 2, the present example concerns an item-based recommender module 102, 202 that functions to provide users who each operating a client device (e.g., a smart phone 104 or personal computer 106) with recommended items based on items with which they have previously engaged. The recommender module 102, 202 may include at least one processor operating a recommender algorithm based on alternating minimization with a matrix of user factors and content factors for an online content library. Each client device 104, 106 may communicate with the recommender 102, 202 via one or more communication and/or computer networks 108, for example, a wide area network, cellular telephony network, or satellite communications network. The recommender may be implemented in any suitable server, for example a stand-alone server, server array, cloud server or distributed server. Results from the recommender may be provided to the client device 104, 106 or to a server 102. If to the client device 104, 106, the client device may generate a display of the recommendations for output to a user interface device, for example a display screen 110, 112. Such display may include on or more objects (e.g., links) operative for retrieving and user-selected ones of the content items recommended by the recommender. Accordingly, methods for evaluating and adapting a recommender module are part of an information system in which a user operating a client device selects and accesses electronic content in a remote library via a user interface, including but not limited to providing the user interface.

Prior to serving users, the recommender may be trained with access to a training set representing 'n' users and 'm' items until ready to serve recommendations. As used herein, a "request" from a client to the recommender is configured to enable the person using the recommender to obtain new recommendations. Features of a client device executing a recommendation process for the user may include access to the user's engagement history in a computer memory and a function for identifying relevant recommendations and showing them to the user.

FIG. 2 represents an overview of recommendation data flow 200. The client device 204 generates engagement data 210 based on user 206 interactions with a content library or database. Then, the client 204 generates a request 214 that it sends to the recommender 202. The request 214 $r \in [0,1]^n$ may be, or may include, a binary, typically sparse, vector in item-space. Each entry in the vector may represent a user's engagement with one item, and nonzero values may represent engagement beyond a certain threshold deemed appropriate for the setting. In embodiments of the systems 100, 200, for each new request from a client, the centralized recommendation server 102, 202 sees only a list of items and receives no identifying information from the client such as a user identifier (ID), device ID, Internet Protocol (IP) address, or other identifier from which the user may be identified.

In embodiments, a request round may include a series of recursive information exchanges between the client and the recommender. In each recommendation round, the client 204 assembles a list of items (the request 212) to send to the recommender, and the recommender 202 returns a list of items (the recommendations 214) based on the items it received from the client. For embodiments wherein the recommender is strictly item-based, each recommendation returned by the recommender, may include 3 parts: (1) the recommended item; (2) the associated item from the original request; and (3) a scaled weight $w \in [0,1]$, wherein w measures the "closeness" of the recommended item to the associated item, i.e., similarity.

In one request round, the recommender returns an equal number of items for each item in the original request. Note that items may be recommended multiple times in the list of recommendations returned by the recommender, as they may be close to one or more different associated items from the original request. This framework should be sufficiently general to extend to a range of item-based recommender implementations.

It may be assumed that the recommender is making recommendations based on some measure of similarity between two items, and that this similarity measure can be computed for any two items in the recommender's corpus. Any suitable similarity measure as known in the art (e.g., Euclidian distance, cosine distance, Jaccard distance, Pearson correlation distance) or that may be developed may be used by a recommender. The similarity measure used by the recommender should be compatible with alternating minimization.

In an aspect, the recommender uses alternating minimization, which enable a server running a recommender to dispose of user and item factors, i.e., the user's prior ratings of content items. This differentiates the current method from approaches where the entire model is available to a client to do recommendations locally, which could pose its own security and privacy risks. The private recommendation method is designed to strike a balance between the privacy that can be offered by on-device processing of recommendations and the design advantages of a centralized recommender.

Further, privacy is improved by deleting the user-supplied factors after a rating vector is computed. The server does not need to store the factors to run alternating minimization. The recommendation matrix M is modeled as a factor model M=AB. The factor A is never stored. Only the factor B is stored on the recommender server. The factor B is defined by B=r×I, wherein r is the rank of the factor model and I is the total number of items in the library.

Figure 3:
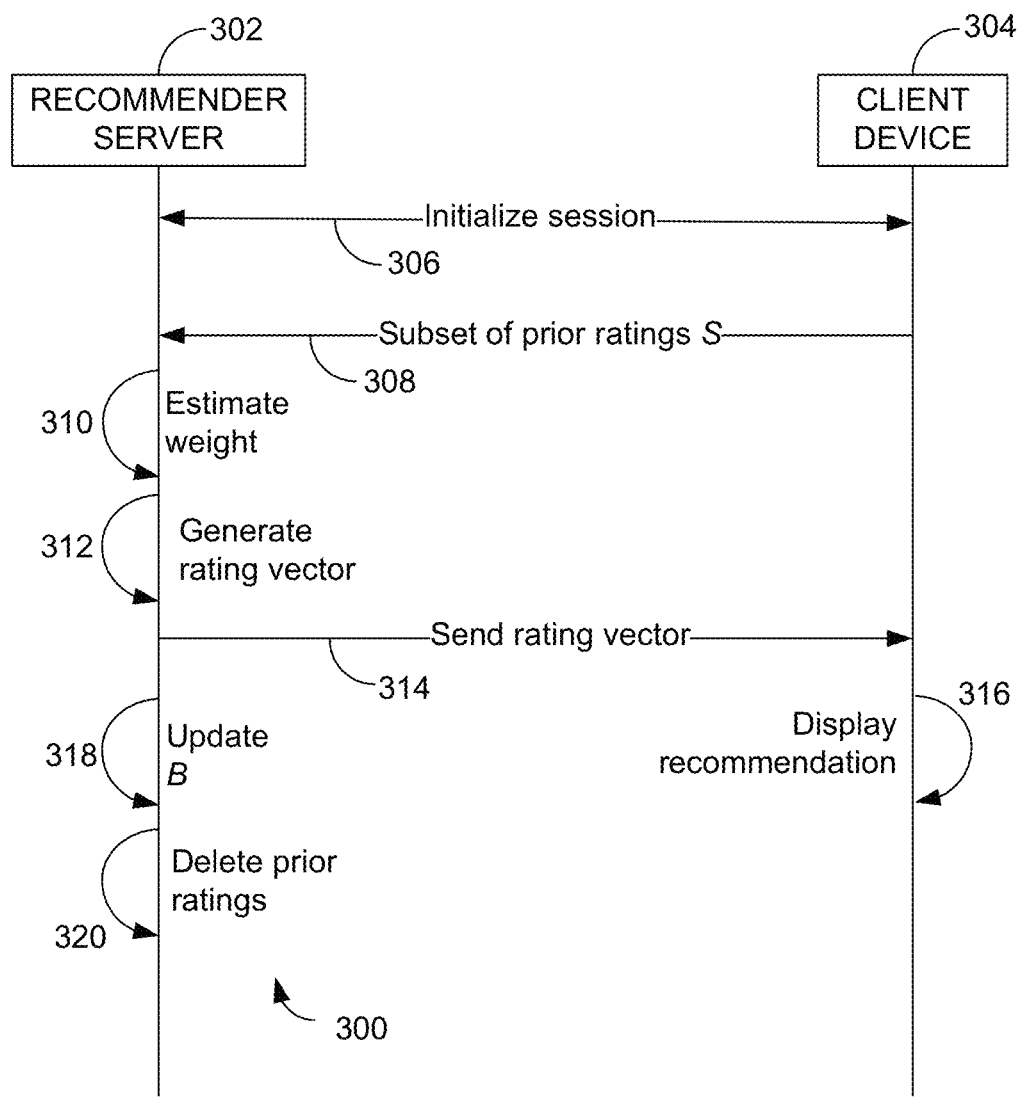
FIG. 3 is a sequence diagram illustrating operations of a method for recommending content to a client device operated by a user.

Referring to FIG. 3, a method 300 by a recommender server 302 includes operations performed by at least one processor of the server 302 in response to input from a client device 304 operated by a user. The method 300 may include, at 306, initializing a communication session with the client device, for example, a streaming session.

At 308, the server receives, from the client device in context of a recommendation request by the user, a subset S of previous ratings by the user of content items in an electronic library. At 310, the server estimates a user weight vector in a factor model for recommendations. In an aspect, estimating the user weight vector may include solving for a vector argmin of a difference function. The difference function may include a summation of squares difference in a factor model, for example, by the algorithm $$\hat{a} = \arg\min_{\|a\| \leq R} \sum\nolimits_{i \in S} \left(B_i^T a - M_{us}\right)^2,$$

wherein 'R' is a radius parameter that can be tuned between infinity and a finite value. Using a finite value may add predictability and stability to the model.

In an alternative aspect of the weight estimation 310, the factor model is a non-negative factor model and the solving is by non-negative least squares, for example, $$\hat{a} = \arg\min_{\text{subject to } a \geq 0, \sum_{i=1}^{r} a_i \leq R} \frac{\sum_{i \in S} \left(B_i^T a - M_{us}\right)^2}{}.$$

This can be solved by nonnegative least squares.

At 312, the server may generate, based on the user weight vector and a factor model, a rating vector comprising a predicted rating for each of second content items. The second content items may include all items in the content library, or a different subset than included in the first subset from the user. In an aspect, the server may generate the rating vector comprises a product of the vector argmin and the matrix B=r×I, using a greedy method wherein a predicted rating for item I is given by:

$$\hat{r}_i = \hat{a}^T B_i.$$

At 314, the server sends the rating vector $\hat{r}_i$ to the client device 304. Optionally, the server may truncate the rating vector prior to sending to the client device, for example, deleting all but the top 'N' messages, wherein N is a non-zero positive integer. Locally on the client device, the client may at 316 select the item with the highest score $r_i$ that the user has not already viewed, and output to a display device.

Then, at 318, the server 302 may update the estimated value of B using stochastic approximation based on the set of ratings received from the client device. For each i∈ S, the server may set $$B_i \leftarrow B_i + \eta(M_{us} - \hat{a}^T B_i)\hat{a}.$$

In an alternative, if using a non-negative factor model for the weight estimation, the server should clip the negative values of $B_i$ at each stochastic gradient descent (SGD) step, such as:

$$B_i \leftarrow B_i + (\eta(M_{us} - \hat{a}^T B_i)\hat{a})_+.$$

At 320, the server deletes the set of ratings S received from the user. In an aspect, the deleting the set of ratings is triggered by the updating B, i.e., the server does not retain S for any longer than needed to update B. In an alternative aspect, the deleting the set of ratings is triggered by the sending the rating vector to the client device i.e., the server does not retain S for any longer than needed to provide the rating vector $\hat{r}_i$ to the client device.

Figure 4:
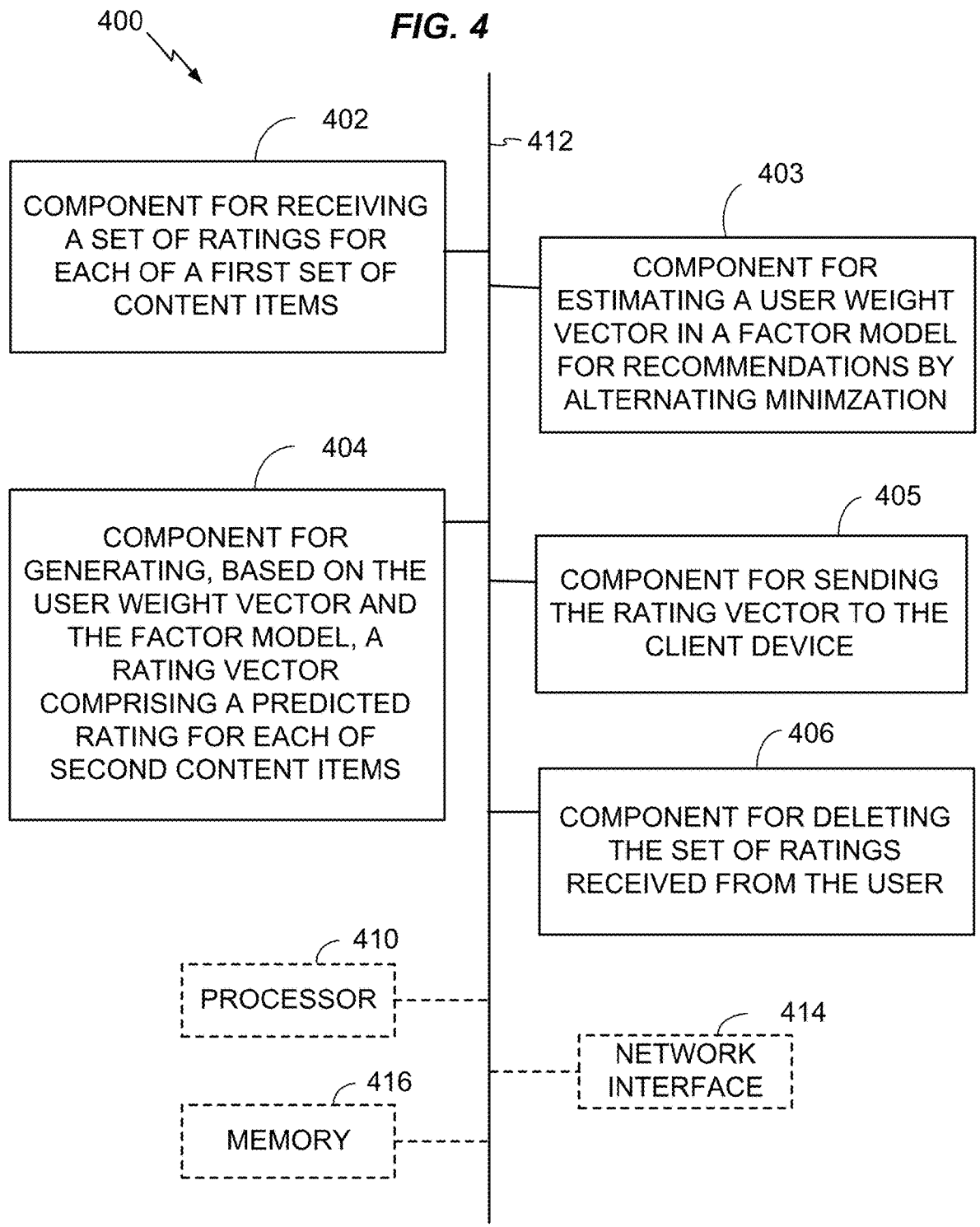
FIG. 4 is a conceptual block diagram illustrating components of an apparatus or system for recommending content to a client device operated by a user.

In accordance with the foregoing, and by way of additional example, FIG. 4 shows a conceptual block diagram illustrating components of an apparatus or system 400 for decrypting encrypted content after a defined future release time as described herein, according to one embodiment. As depicted, the apparatus or system 400 may include functional blocks that can represent functions implemented by a processor, software, or combination thereof (e.g., firmware).

As illustrated in FIG. 4, the apparatus or system 400 may comprise an electrical component 402 for receiving a set of ratings for each of a first set of content items by a user from a client device. The component 402 may be, or may include, a means for said receiving. Said means may include the processor 410 coupled to the memory 416 and to the network interface 414, the processor executing an algorithm based on program instructions stored in the memory. Such algorithm may include a sequence of more detailed operations, for example, initiating a streaming session with the client device, and receiving the set of rating as data in the streaming session.

The apparatus or system 400 may further comprise an electrical component 403 for estimating a user weight vector in a factor model for recommendations by alternating minimization. The component 403 may be, or may include, a means for said estimating. Said means may include the processor 410 coupled to the memory 416 and to the network interface 414, the processor executing an algorithm based on program instructions stored in the memory. Such algorithm may include a sequence of more detailed operations, for example, as detailed in connection with FIG. 3 at 310.

The apparatus or system 400 may further comprise an electrical component 404 for generating, based on the user weight vector and the factor model, a rating vector comprising a predicted rating for each of second content items. The component 404 may be, or may include, a means for said generating. Said means may include the processor 410 coupled to the memory 416 and to the network interface 414, the processor executing an algorithm based on program instructions stored in the memory. Such algorithm may include a sequence of more detailed operations, for example, as detailed in connection with FIG. 3 at 312.

The apparatus or system 400 may further comprise an electrical component 405 for sending the rating vector to the client device. The component 405 may be, or may include, a means for said sending. Said means may include the processor 410 coupled to the memory 416 and to the network interface 414, the processor executing an algorithm based on program instructions stored in the memory. Such algorithm may include a sequence of more detailed operations, for example, transmitting the rating vector as data in the streaming session, or in the alternative, formatting the data for transmission by a network protocol and providing the data to a transport layer.

The apparatus or system 400 may further comprise an electrical component 406 for deleting the set of ratings received from the user. The component 406 may be, or may include, a means for said deleting. Said means may include the processor 410 coupled to the memory 416 and to the network interface 414, the processor executing an algorithm based on program instructions stored in the memory. Such algorithm may include a sequence of more detailed operations, for example, a testing a conditional statement such as whether the rating vector is sent and/or the matrix B is updated, and deleting the set of ratings from a memory location if the condition is satisfied.

The apparatus 400 may optionally include a processor module 410 having at least one processor, in the case of the apparatus 400 configured as a data processor. The processor 410, in such case, may be in operative communication with the modules 402-406 via a bus 412 or other communication coupling, for example, a network. The processor 410 may effect initiation and scheduling of the processes or functions performed by electrical components 402-406.

In related aspects, the apparatus 400 may include a network interface module 414 operable for communicating with the client device over a computer network. In further related aspects, the apparatus 400 may optionally include a module for storing information, such as, for example, a memory device/module 416. The computer readable medium or the memory module 416 may be operatively coupled to the other components of the apparatus 400 via the bus 412 or the like. The memory module 416 may be adapted to store computer readable instructions and data for effecting the processes and behavior of the modules 402-406, and subcomponents thereof, or the processor 410, or the method 300 and one or more of the additional operations described in connection with the method 300. The memory module 416 may retain instructions for executing functions associated with the modules 402-406. While shown as being external to the memory 416, it is to be understood that the modules 402-406 can exist within the memory 416.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Program instructions may be written in any suitable high-level language, for example, C, C++, C#, JavaScript, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether machine code on the bundle can be executed independently of other machine code. In other words, the modules may be high-level modules only.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. As used herein, a "processor" encompasses any one or functional combination of the foregoing examples.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for recommending content to a client device operated by a user, the method comprising:
    receiving, by at least one processor, a set of ratings for each of a first set of content items by a user from a client device;
    estimating, by the at least one processor, a user weight vector in a factor model for recommendations;
    generating, by the at least one processor based on the user weight vector and a factor model, a rating vector comprising a predicted rating for each of second content items;
    sending the rating vector to the client device; and
    deleting the set of ratings received from the user.

2. The method of claim 1, wherein estimating the user weight vector comprising solving for a vector argmin of a difference function.

3. The method of claim 2, wherein the difference function includes a summation of squares difference in a factor model.

4. The method of claim 3, wherein the factor model is a non-negative factor model and the solving is by non-negative least squares.

5. The method of claim 1, wherein generating the rating vector comprises a product of the vector argmin and a matrix B=r×I, wherein r is a rank of a factor model and I is a total number of content items.

6. The method of claim 1, further comprising updating B using a stochastic approximation based on the set of ratings received from the client device.

7. The method of claim 6, wherein the deleting the set of ratings is triggered by the updating B.

8. The method of claim 1, wherein the deleting the set of ratings is triggered by the sending the rating vector to the client device.

9. The method of claim 1, further comprising truncating the rating vector prior to sending to the client device.

10. An apparatus for recommending content to a client device operated by a user, the apparatus comprising at least one processor coupled to a memory, the memory holding program instructions that when executed by the at least one processor, cause the apparatus to perform:
    receiving a set of ratings for each of a first set of content items by a user from a client device;
    estimating a user weight vector in a factor model for recommendations by alternating minimization;
    generating, based on the user weight vector and the factor model, a rating vector comprising a predicted rating for each of second content items;
    sending the rating vector to the client device; and
    deleting the set of ratings received from the user.

11. The apparatus of claim 10, wherein the memory holds further instructions for estimating the user weight vector at least in part by solving for a vector argmin of a difference function.

12. The apparatus of claim 11, wherein the memory holds further instructions for calculating the difference function comprising a summation of squares difference in a factor model.

13. The apparatus of claim 12, wherein the memory holds further instructions for the factor model being a non-negative factor model and for the solving by non-negative least squares.

14. The apparatus of claim 10, wherein the memory holds further instructions for generating the rating vector at least in part by a product of the vector argmin and a matrix B=r×I, wherein r is a rank of a factor model and I is a total number of content items.

15. The apparatus of claim 10, wherein the memory holds further instructions for updating B using a stochastic approximation based on the set of ratings received from the client device.

16. The apparatus of claim 15, wherein the memory holds further instructions for the deleting the set of ratings triggered by the updating B.

17. The apparatus of claim 15, wherein the memory holds further instructions for the deleting the set of ratings triggered by the sending the rating vector to the client device.

18. The apparatus of claim 10, wherein the memory holds further instructions for truncating the rating vector prior to sending to the client device.

* * * * *